United States Patent
Greeff et al.

(10) Patent No.: US 7,287,108 B2
(45) Date of Patent: *Oct. 23, 2007

(54) CAPACITIVE MULTIDROP BUS COMPENSATION

(75) Inventors: Roy Greeff, Boise, ID (US); Terry R. Lee, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 289 days.

This patent is subject to a terminal disclaimer.

(21) Appl. No.: 10/795,523

(22) Filed: Mar. 9, 2004

(65) Prior Publication Data

US 2004/0170074 A1    Sep. 2, 2004

Related U.S. Application Data

(62) Division of application No. 09/637,796, filed on Aug. 11, 2000, now Pat. No. 6,745,268.

(51) Int. Cl.
*G06F 13/00* (2006.01)
*H03B 1/00* (2006.01)
*H01P 5/08* (2006.01)
*H01P 5/12* (2006.01)
*H03H 7/38* (2006.01)

(52) U.S. Cl. ............... 710/100; 327/109; 333/17.3; 333/32; 333/124

(58) Field of Classification Search ........... 710/100, 710/305; 333/17.3, 32, 124; 365/200
See application file for complete search history.

(56) References Cited

U.S. PATENT DOCUMENTS 4,320,521 A * 3/1982 Balakrishnan et al. ...... 375/257
5,586,181 A * 12/1996 Kiko ..................... 379/399.01

(Continued)

OTHER PUBLICATIONS

Insitute of Electrical and Electronics Engineers, Inc., "The Authoritative Dictionary of IEEE Standards Terms", 2000, IEEE Press Standards Information Network, Seventh Edition, p. 388.*

(Continued)

*Primary Examiner*—Mark H. Rinehart
*Assistant Examiner*—Faisal Zaman
(74) *Attorney, Agent, or Firm*—Dickstein Shapiro LLP

(57) ABSTRACT

The signal integrity of a high speed heavily loaded multidrop memory bus is often degraded due the numerous impedance mismatches. The impedance mismatches causes the bus to exhibit a nonlinear frequency response, which diminishes signal integrity and limits the bandwidth of the bus. A compensating element, such as a capacitor which ties the bus to a reference plane (e.g., a ground potential), or an inductor wired in series with the bus, is located approximately midway between the memory controller and the memory slots. The use of the compensating element equalizes signal amplitudes and minimizes phase errors of signals in an interested frequency range and diminishes the amplitudes of high frequency signals which exhibit high degrees of phase error. The resulting bus structure has increased desirable harmonic content with low phase error, thereby permitting the bus to exhibit better rise time performance and permitting a higher data transfer rate.

6 Claims, 7 Drawing Sheets

U.S. PATENT DOCUMENTS

| | | |
|---|---|---|
| 5,926,031 A | 7/1999 | Wallace et al. |
| 5,945,886 A * | 8/1999 | Millar ........................... 333/1 |
| 6,067,594 A * | 5/2000 | Perino et al. ............... 710/301 |
| 6,078,515 A | 6/2000 | Nielsen et al. |
| 6,094,091 A * | 7/2000 | Okajima .................... 327/540 |
| 6,256,235 B1 * | 7/2001 | Lee ....................... 365/189.11 |
| 6,434,647 B1 * | 8/2002 | Bittner, Jr. .................. 710/100 |
| 6,745,268 B1 * | 6/2004 | Greeff et al. ............... 710/100 |

OTHER PUBLICATIONS

"RC Filter" and "RL Filter", Wikipedia.org, retrieved from the Internet on May 10, 2006 at http://en.wikipedia.org/wiki/RC_filter and http://en.wikipedia.org/wiki/RL_circuit.*

Intel 815 Chipset Platform, Design Guide, Jun. 2000, pp. 1-16, 21 and 51-60.

* cited by examiner

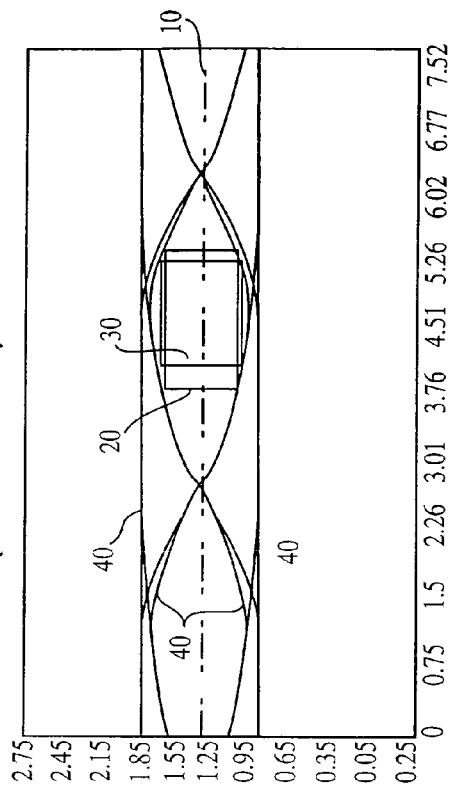
FIG.3A (PRIOR ART)
FIG.3B (PRIOR ART)
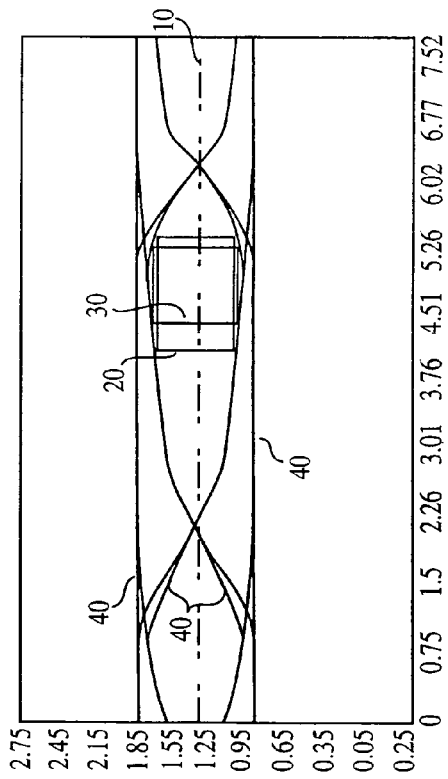
FIG.3C (PRIOR ART)
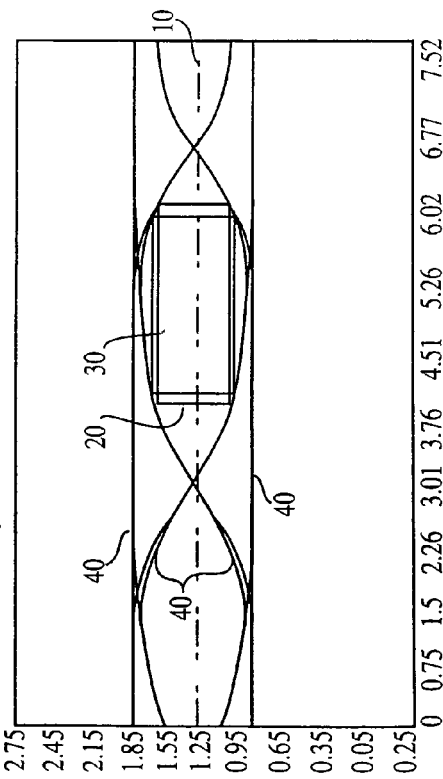
FIG.3D (PRIOR ART)

CAPACITIVE MULTIDROP BUS COMPENSATION

This application is a divisional of U.S. application Ser. No. 09/637,796 filed Aug. 11, 2000, now U.S. Pat. No. 6,745,268, the entire disclosure which is hereby incorporated by reference.

FIELD OF THE INVENTION

The present invention relates to improving signal integrity of data signals applied to a bus and, more particularly, to the use of a compensating element for improving the signal integrity of a fully loaded high speed memory bus.

BACKGROUND OF THE INVENTION

Memory systems for computers provide many memory devices on a common bus to allow larger storage and transmission capacities than can be obtained with a single memory device. The memory devices are multiplexed on to a multidrop bus to reduce the pin count of a memory bus master or controller. Most of these systems require user upgradeable or replaceable components to allow future expansion or repair of the memory subsystems. Typically, these systems are upgraded on a module basis, where the memory module (e.g., a dual in-line memory module or DIMM) has several devices on a small printed circuit board (PCB), and the module plugs into a connector that provides an electrical connection to the memory subsystem bus.

From a signal integrity standpoint, the provision of many memory devices on the bus can be problematic since these modules represent electrical stubs to the memory bus, which causes reflection on the bus. These reflections degrade the signal integrity and therefore, limit the maximum bandwidth or timing margin of the system. A robust electrical design is required in a high speed multidrop memory bus since the signal integrity must be acceptable to lightly loaded systems, that is, where only a small number of module slots are populated, heavily loaded systems, and for every device on the bus. A signal analysis of a typical memory subsystem has shown degraded signal integrity when the memory subsystem is fully loaded.

An example of a multidrop memory bus that must carefully balance the design for different loading characteristics is one which is intended for use with a double data rate synchronous dynamic random access memory (DDR SDRAM) main memory system. Such systems often have up to four memory slots that operate at a bus frequency of at least 133 MHz. Each memory slot can be populated with a single bank or double bank memory module. Balancing the design to be acceptable for both lightly and fully loaded situations can be challenging due to the number of slots, varying number of banks on the memory modules, and minor impedance mismatches between the memory modules and the memory bus.

Now referring to the drawings, where like reference numerals designate like elements, there is shown in FIG. 1 a conventional memory system 1. The memory system 1 includes a memory controller 200, which may be coupled to a computer system via a local bus 1000, which is also coupled to a processor 1100 and an expansion bus controller 1200. The expansion bus controller 1200 is also coupled to one or more expansion buses 2000, to which various peripheral devices such as mass storage devices, keyboard, mouse, graphics adapters, and multimedia adapters may be attached.

The memory controller 200 is also coupled to a memory bus 100, which includes a plurality of sockets 106a-106d. The sockets 106a-106d may be left empty, or they can accept memory modules 300a-300d. The memory modules may be double bank modules containing a first memory bank 301a-301d and a second memory bank 302a-302d, respectively, or the memory modules may be single banked modules containing only the first memory bank 301a-301d.

In order to operate the memory bus 100 at high speed, it is important to minimize signal reflections within the bus. To this end, the memory bus 100 includes a transmission line 101 that contains a source resistor 105, which splits the transmission line 101 into a first segment 102 running from the memory controller to the source resistor 105 and a second segment 103 which runs from the source resistor 105 to a terminator 104 and which includes the plurality of sockets 106a-106d. The terminator 104 includes a terminating resistor $R_{term}$ and a termination voltage source $V_{TT}$. The use of the source resistor 105, terminating resistor $R_{term}$, and termination voltage source $V_{TT}$ is designed to match the memory bus 100 loaded impedance. When the memory bus is populated with memory modules 300a-300d (via the sockets 106a-106d), electrical stubs are created on the memory bus. These stubs reduce the effective impedance at that point on the bus, and this creates signal reflections which reduce the signal integrity and the maximum possible data rate that can be transferred on the bus.

When a four socket memory system has each socket populated by a double bank memory module, there are a large number of minor impedance mismatches leading to a significant decrease in signal integrity. FIG. 2A-2D are examples of signal plots of read operations from each of the four double bank memory modules 300a-300d, respectively. Similarly, FIGS. 3A-3D are examples of signal plots of write operations to each of the four double bank memory modules 300a-300d, respectively.

Each signal plot shows a reference voltage 10, an aperture box 20 for a first overdrive voltage, and an aperture box 30 for a second overdrive voltage. The reference voltage 10 is the baseline voltage of the memory bus 100. Signals are detected on the memory bus 100 by either the memory controller 200 or the memory modules 300a-300d when the voltage level of the signal differs by a minimum threshold, or overdrive voltage threshold, from the reference voltage 10. For example, a logical low, sometimes called voltage output low or $V_{ol}$, is detected on the memory bus 100 when the signal is at a voltage below the difference between the reference voltage 10 and the overdrive threshold voltage, while a logical high, sometimes called voltage output high or $V_{oh}$, is detected when the signal is at a voltage above the sum of the reference voltage 10 and the overdrive voltage. Two separate overdrive voltage thresholds are shown on the signal plots because differing memory systems may require different overdrive thresholds. For example, the use of the larger second overdrive parameter may result in more accurate signal detection in a noisy environment. The two aperture boxes 20, 30 illustrate the period of time when the plotted signals 40 differed by at least a first or second overdrive voltage threshold, respectively, to be detectable as either voltage output high or voltage output low. The plotted signals 40 are the signals that are seen by the memory controller 200 when the memory modules 300a-300d drive signals onto the memory bus 100 (i.e., for the read operations illustrated in FIGS. 2A-2D), as well as the signals seen at each memory module 300a-300d when the memory controller 200 drives signals onto the memory bus 100 (i.e., for the write operations illustrated in FIGS. 3A-3D). In each case, the signals driven onto the memory bus 100 are a plurality of pseudo-random pulses.

As illustrated in FIGS. 2A-2D and FIGS. 3A-3D, the conventional system exhibits the following characteristics. When using the first overdrive threshold of 0.31 volts for read operations, the four memory modules have signal aperture times of 2.33 nanoseconds (ns), 2.29 ns, 2.33 ns, and 2.29 ns, respectively. For writes, the aperture times are 1.25 ns, 1.67 ns, 1.83 ns, and 1.92 ns, respectively. When using the second (larger) overdrive voltage threshold of 0.35 volts for read operations, the four memory modules have aperture times of 0.83 ns, 1.83 ns, 2.04 ns, and 2.00 ns, respectively. For writes, the aperture times are 0.71 ns, 1.25 ns, 1.54 ns, 1.58 ns. Thus, a fully loaded conventional memory bus 100 exhibits poor aperture times for write operations, especially when the overdrive threshold is set at 0.35 volts. Additionally, reads from the first memory module also exhibit poor aperture times at the 0.35 volt overdrive threshold.

Accordingly, there is a desire and need to improve the signal integrity of a fully loaded memory system in order to permit high speed operation.

SUMMARY OF THE INVENTION

The present invention improves the signal integrity of a high speed fully loaded multidrop memory bus without compromising the signal integrity when the bus is lightly loaded. A typical high speed multidrop memory bus is designed for impedance matching between the bus and the various memory modules that can be inserted into the memory slots. However, minor impedance mismatches introduce unwanted signal reflections into the bus. The presence of the reflections cause phase and amplitude aberrations in the frequency response of the bus. The frequencies in which these aberrations occur are related to the electrical length of the bus, and the location of poles and zeros in the frequency domain (caused by the parasitic capacitance and inductance). In the prior art bus structure, these aberrations occur relatively low in frequency when compared to the operation frequency of the bus. In the present invention, a compensating element, such as a capacitor that connects the bus to a reference plane, is placed approximately midway, i.e., approximately 40% and 60% of the distance between the memory controller and the memory slots. The compensating element alters the frequency response of the bus by introducing another pole into the frequency domain. By carefully choosing and placing the compensating element, the frequency response of the bus can be altered to peak at a lower frequency, thereby increasing the amount of desirable harmonic content. While this technique also increases the degree of phase error at high frequency, the introduction of the additional pole in the frequency domain serves to attenuate the amplitude of high frequency signals, thereby mitigating their affect on the frequency response. Therefore, adding the compensating element results in an equalization of signal amplitudes at frequencies where the phase error is minimal, and an attenuation of amplitudes at frequencies where the phase error is significant. This results in a bus structure which exhibits better rise times, which permits the bus to be operated at a higher data rate.

BRIEF DESCRIPTION OF THE DRAWINGS

The foregoing and other advantages and features of the invention will become more apparent from the detailed description of the preferred embodiments of the invention given below with reference to the accompanying drawings in which:

FIGS. 3A, 3B, 3C, and 3D are timing diagrams showing the aperture widths during a write operation for each of the memory modules, respectively, of the system of FIG. 1;

DETAILED DESCRIPTION OF THE PREFERRED EMBODIMENTS

Figure 1:
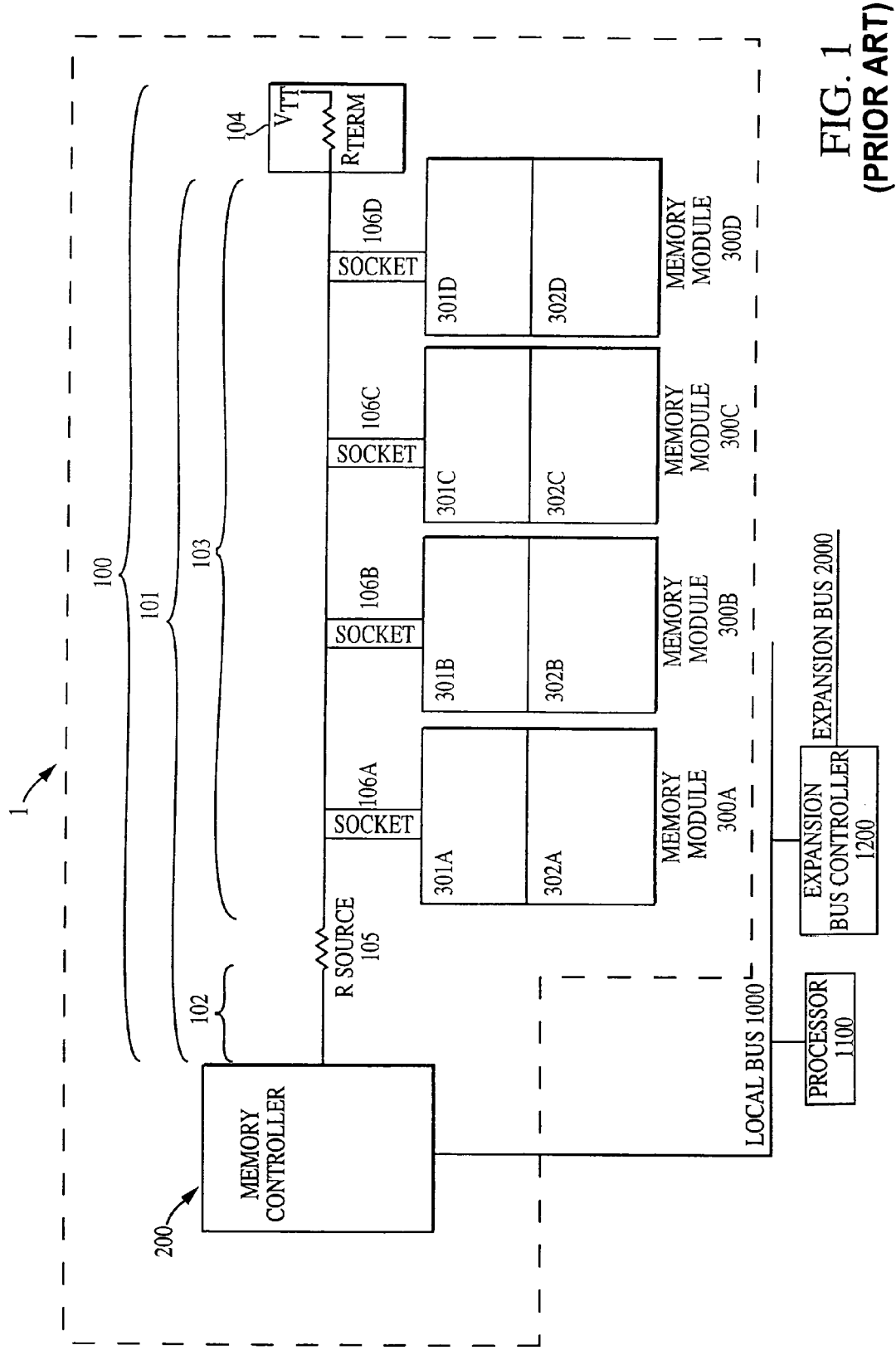
FIG. 1 is a block diagram of a computer system with a conventional memory bus with four slots each populated with a double bank memory module.
Figure 2A:
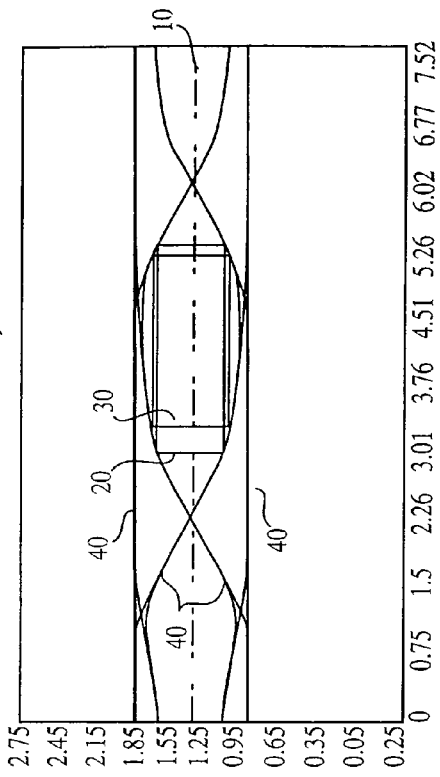
FIGS. 2A, 2B, 2C, and 2D are timing diagrams showing aperture widths during a read operation for each of the memory modules, respectively, of the system of FIG. 1.
Figure 2B:
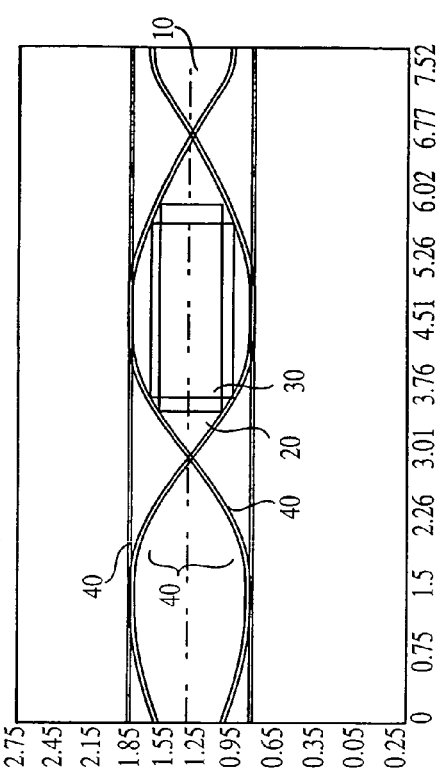
Figure 2C:
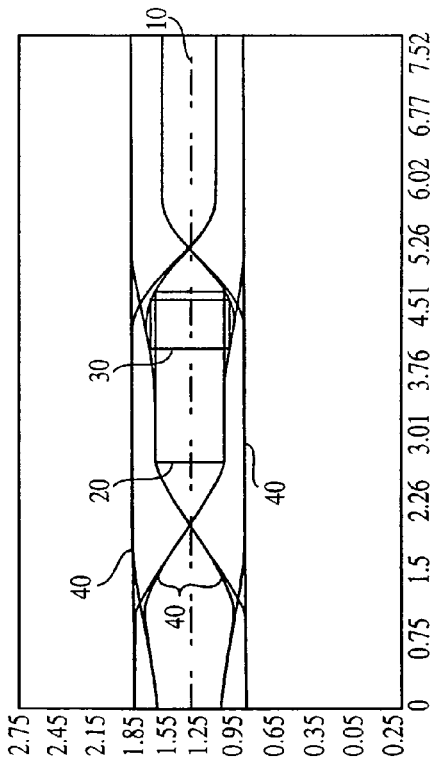
Figure 2D:
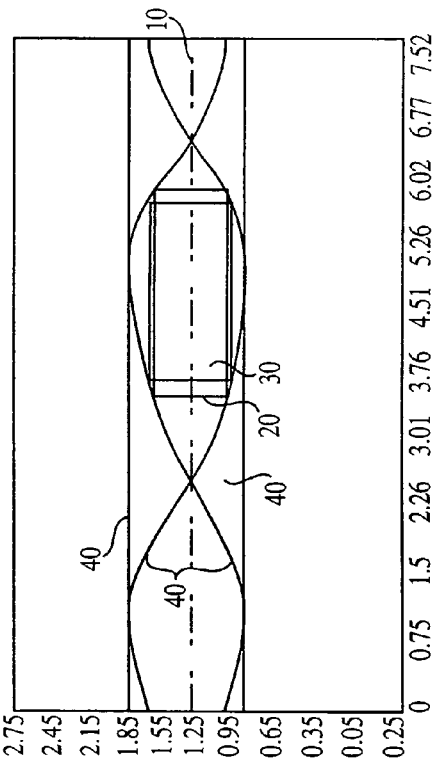
Figure 4:
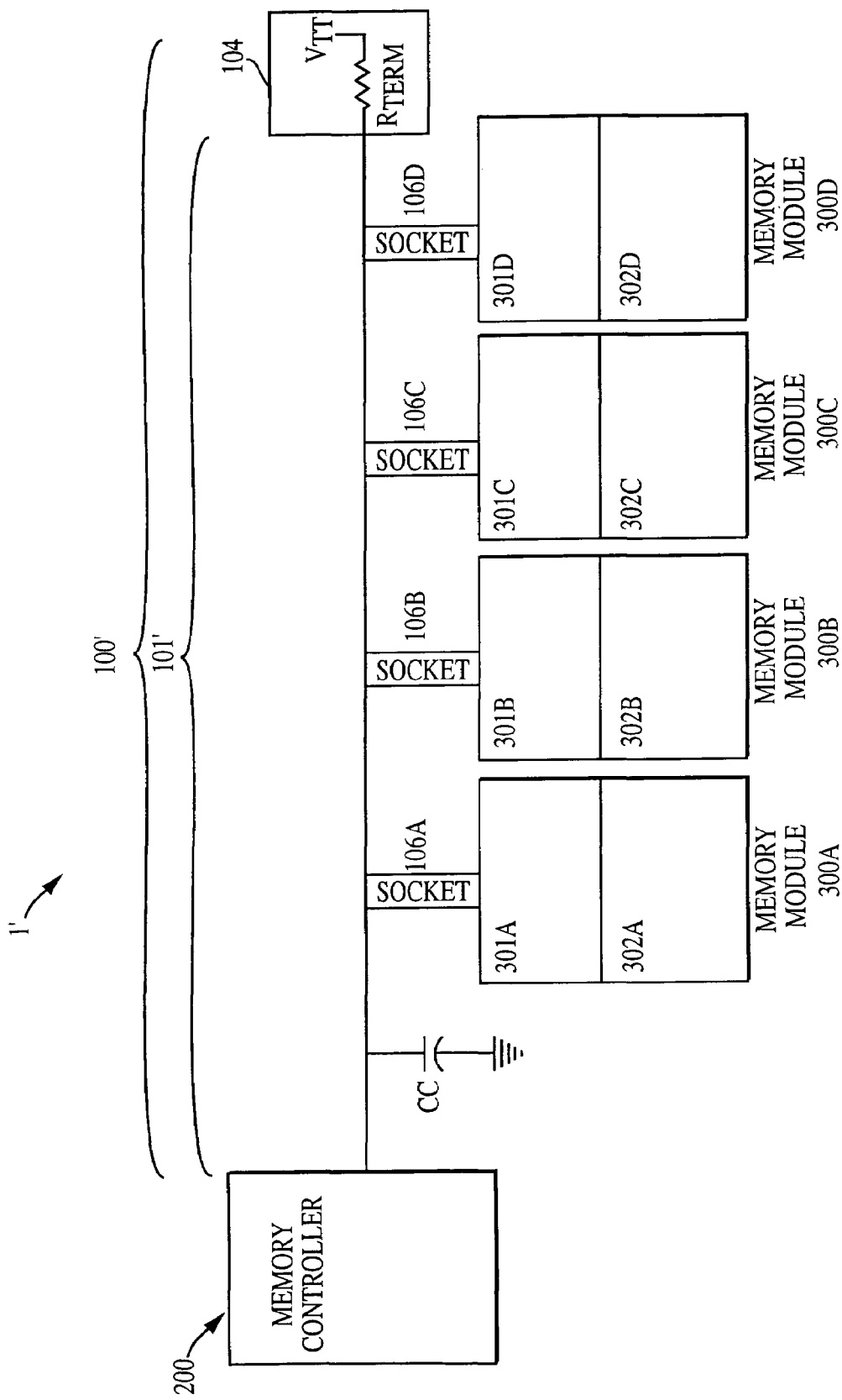
FIG. 4 is a block diagram of a four slot memory bus in accordance with one exemplary embodiment of the present invention, wherein each of the four slots is populated with a double bank memory module.

Now referring to FIG. 4, a first exemplary embodiment of the present invention is illustrated. FIG. 4 shows a memory system 1' including a memory controller 200, a memory bus 100' including a transmission line 101' to which a plurality of sockets 106a-106d are attached. A plurality of memory modules 300a-300d may be inserted into the plurality of sockets 106a-106d. As in the conventional bus 100 (FIG. 1), the memory bus 100' is terminated by a terminator 104, which includes a termination resistor $R_{term}$ and a termination voltage source $V_{TT}$. In this exemplary embodiment, the termination resistor $R_{term}$ is a 27 ohm resistor, however, different resistances may be used. For example, a larger resistance, such as 37 ohms may also be used to reduce current requirements. Two significant differences between the exemplary bus 100' and the prior art bus are the removal of the source resistor 105 of the prior art bus and the insertion of a compensating element, such as a compensating capacitor CC, which is connected between the memory bus 100' and a ground potential (hereinafter "ground"). The compensating element does not need to be a capacitor. For example, the compensating element can also be an inductor wired in series with the bus. The compensating element, for example, the compensating capacitor CC, serves as a low pass filter and also equalizes the signal amplitudes and minimizes phase errors of signals within a frequency range of interest. The compensating element is chosen and placed so that the frequency range of interest includes the operational frequency of the bus.

In this exemplary bus 100', the compensating element is a 39 pF compensating capacitor and the memory modules 300a-300d are dual inline memory modules (DIMMs) containing double data rate synchronous dynamic random access memory (DDR SDRAM) devices operating at a bus frequency of 133 MHz. Alternatively, the amount of capacitance, as well as the operating frequency can be varied. Placement of the compensating capacitor CC is important. In general, placing the compensating capacitor CC close to the memory modules decreases signal integrity for read and write operations. Placing the compensating capacitor CC close to the memory controller 200 increases signal integrity for both reads and writes at a cost of possibly slightly reducing bus bandwidth. Placing the compensating capacitor CC near the midpoint between the memory controller 200 and the memory modules 300a-300d increases signal integrity for both reads and writes without sacrificing bandwidth. In this exemplary embodiment, the length from the memory controller 200 to the first memory socket 106a is 2.5 inches and the compensating capacitor is placed at a distance of 1 inch from the memory controller 200. If the compensating capacitor CC was placed at or beyond 1.25 inches from the memory controller 200, signal integrity suffered. In another exemplary embodiment, the length from the memory controller 200 to the first memory socket 106a was reduced to 1.5 inches and the compensating capacitor was placed at 0.7 inches away from the memory controller 200.

FIGS. 6A-6D and 7A-7D are signal plots of read and write operations, respectively, to each of the four memory modules 300a-300d. Each signal plot shows a reference voltage 10 of 1.25 volts, an aperture box 20 for a first overdrive voltage of 0.31 volts and an aperture box 30 for a second overdrive voltage of 0.35 volts. Also shown are the signals 40 that are seen by the memory controller when the memory modules 300a-300d drive signals onto the memory bus 100' (i.e., for the read operation shown in FIGS. 6A-6D), as well as the signals seen at each memory module 300a-300d when the memory controller 200' drives signals onto the memory bus 100' (i.e., for the write operations illustrated in FIGS. 7A-7D.) In each case, the signals which are driven onto the memory bus 100' are pseudo-random pulses. The two aperture boxes 20, 30 illustrate the period of time when the plotted signals differed by at least a first or second overdrive voltage threshold, respectively, to be detectable as either voltage output high or voltage output low.

A comparison between FIGS. 6A-6D with FIGS. 2A-2D and between FIGS. 7A-7D with FIGS. 3A-3D readily reveals that the signal plots of the exemplary embodiment exhibit some jitter, as shown by a large plurality of signal traces at slightly varying voltage levels. This is in contrast to the plurality of signal traces in the corresponding signal plots for the prior art system, which exhibits a smaller degree of jitter. The increased jitter shown in the signal plots of the exemplary embodiment is the result of inter-symbol interference caused by the use of the compensating capacitor CC. The comparison between the two sets of figures also reveals that the exemplary bus 100' has improved, i.e., larger, aperture times. More specifically, when using the first overdrive threshold of 0.31 volts, for read operations, the four memory modules have apertures times of 2.13 ns, 2.25 ns, 2.29 ns, and 2.29 ns, respectively. For writes, the aperture times are 2.75 ns, 2.79 ns, 2.83 ns, and 2.83 ns, respectively. When using the second overdrive threshold of 0.35 volts, for read operations, the aperture times are 1.79 ns, 2.00 ns, 2.08 ns, and 2.08 ns, respectively. For writes, the aperture times are 2.58 ns, 2.63 ns, 2.71 ns, and 2.71 ns, respectively.

Thus, the exemplary bus 100' exhibits significantly increased aperture times for write operations with either overdrive voltage threshold, and increased aperture times for read operations at the higher 0.35 volt threshold. For reads using the lower 0.31 volt overdrive voltage threshold, there is a slight reduction of aperture times, but the resulting aperture time is still acceptable.

Figure 5:
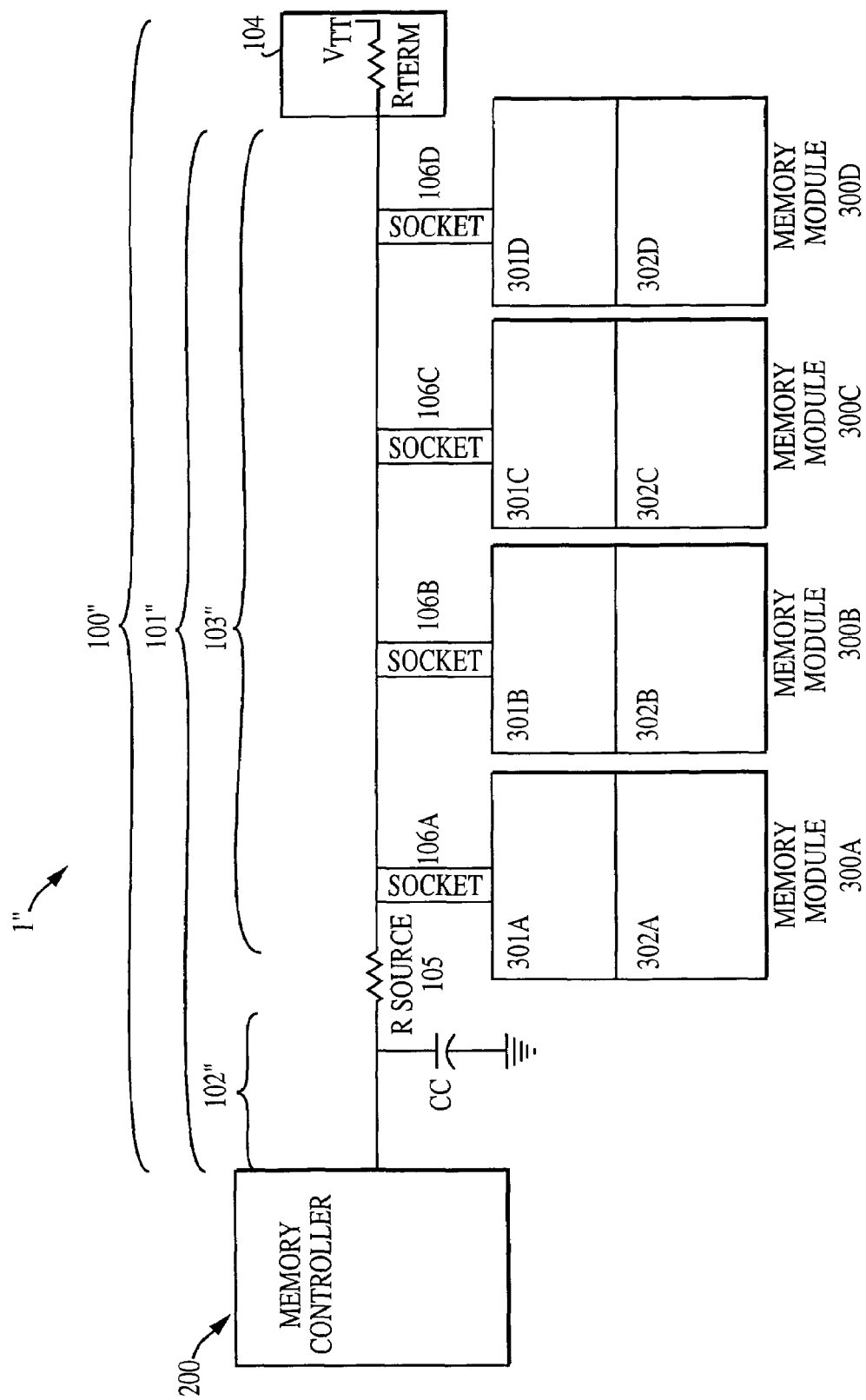
FIG. 5 is a block diagram of a four slot memory bus in accordance with an another exemplary embodiment of the invention, wherein each of the four slots is populated with a double bank memory module.
Figure 6A:
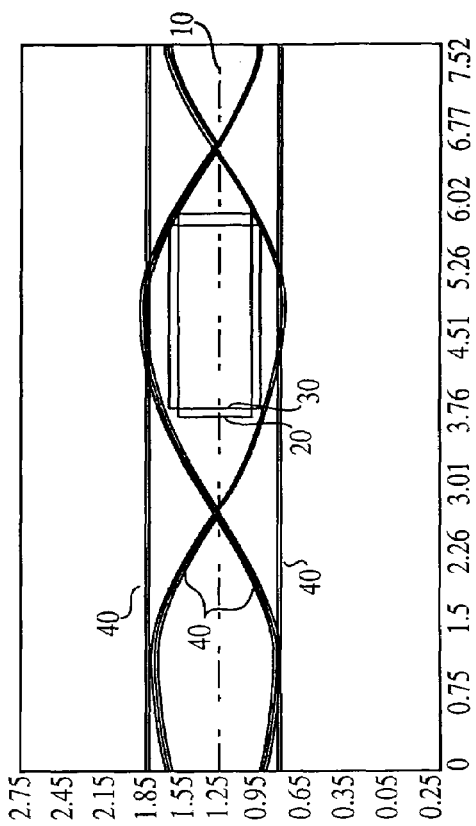
FIGS. 6A, 6B, 6C, and 6D are timing diagrams showing the aperture widths during a read operation for each of the memory modules, respectively, of the system of FIG. 4.
Figure 6B:
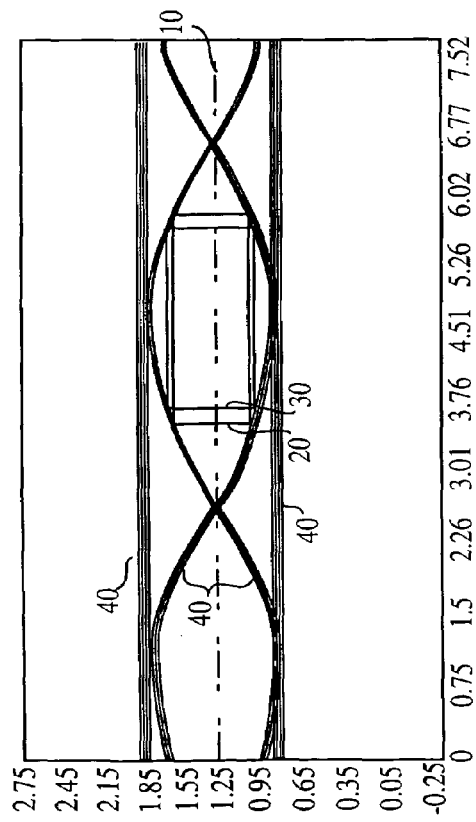
Figure 6C:
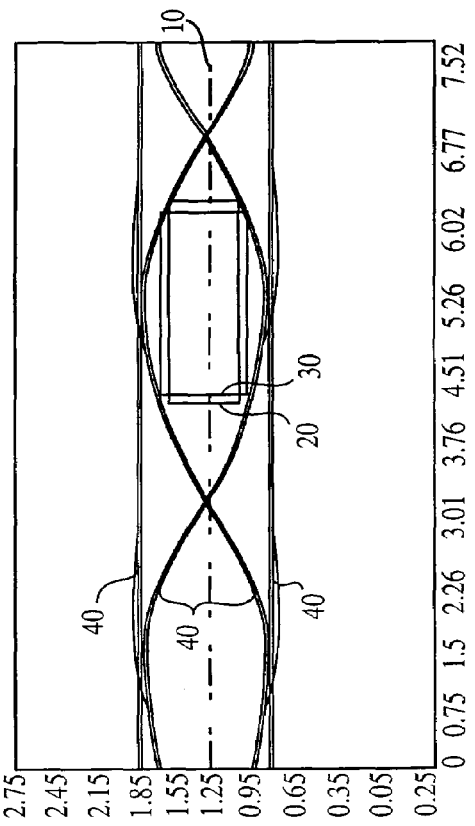
Figure 6D:
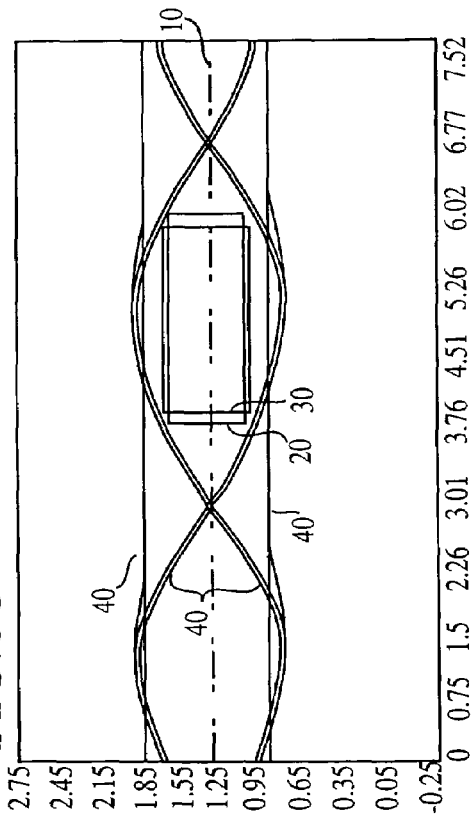
Figure 7A:
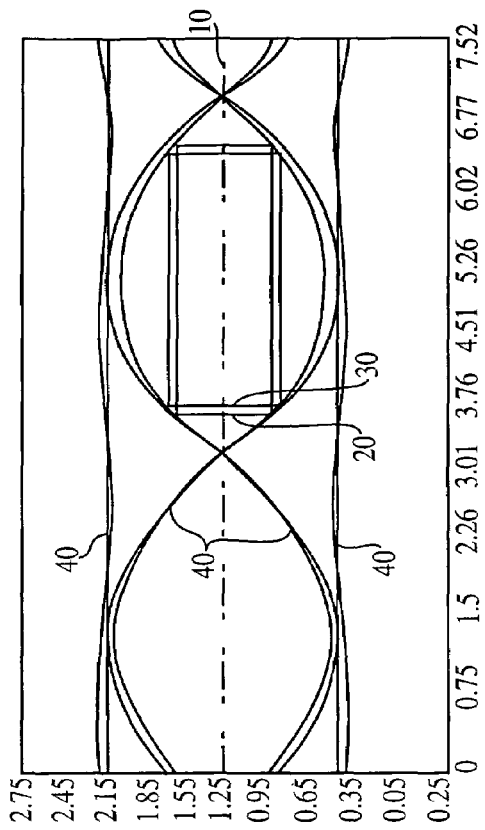
FIGS. 7A, 7B, 7C, and 7D are timing diagrams showing the aperture widths during a write operation for each of the memory modules, respectively, of the system of FIG. 4.
Figure 7B:
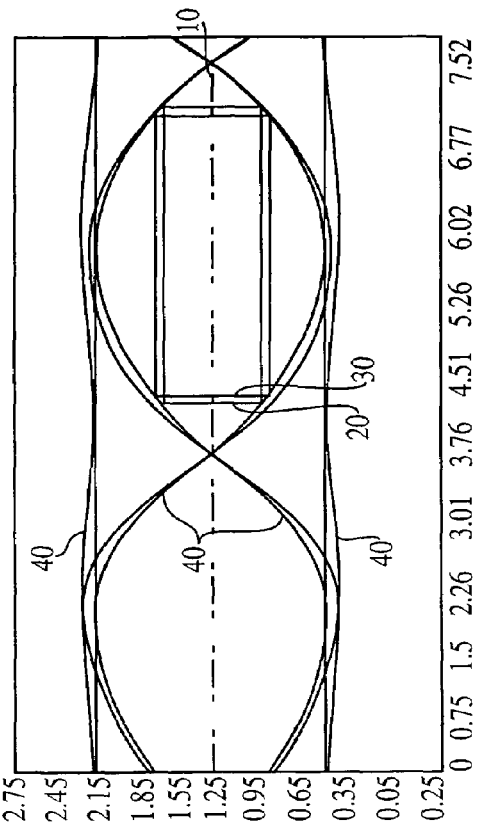
Figure 7C:
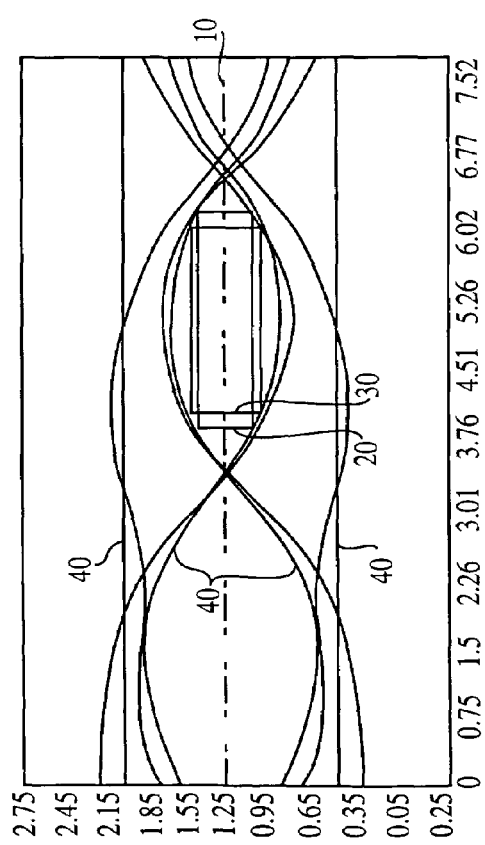
Figure 7D:
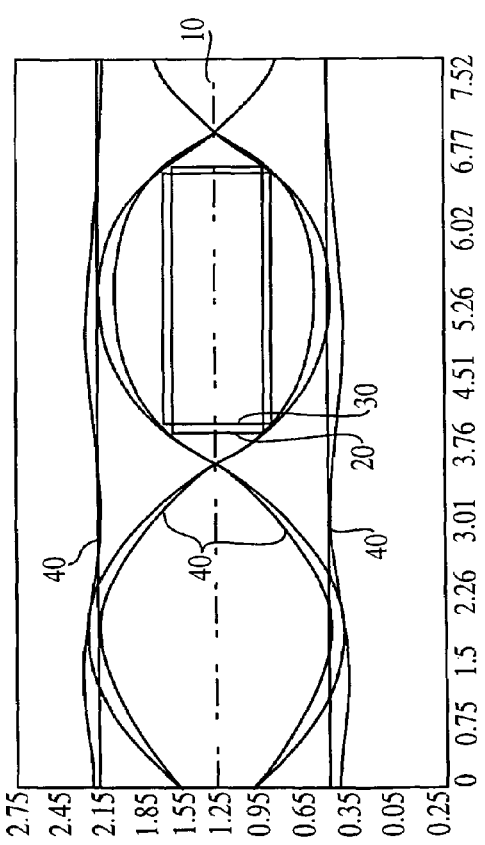

Referring now to FIG. 5, the present invention may also be practiced in a memory system 1" using a memory bus 100" comprising a transmission line 101" split into a first segment 102" and a second segment 103" by the source resistor 105. In some cases, signal integrity is improved by retaining the source resistor 105 and adding the compensating capacitor CC as shown in FIG. 5. In other cases, the use of the compensating capacitor CC without the presence of the source resistor 105 is advantageous.

The technique of the present invention is applicable beyond improving the signal integrity of a data bus in a memory system. The compensating capacitor may also be used, for example, to improve the signal integrity of the control and address buses. The memory buses 100', 100", of the present invention may be part of a memory subsystem of a computer system, or any other electronic system with a memory subsystem.

While certain embodiments of the invention have been described and illustrated above, the invention is not limited to these specific embodiments as numerous modifications, changes and substitutions of equivalent elements can be made without departing from the spirit and scope of the invention. Accordingly, the scope of the present invention is not to be considered as limited by the specifics of the particular structures which have been described and illustrated, but is only limited by the scope of the appended claims.

What is claimed as new and desired to be protected by Letters Patent of the United States is:

1. In a multidrop bus having a transmission line with a first end, a second end, and a plurality of memory slots located between the first end and the second end, a method of improving signal integrity of the bus comprising the step of:

altering a frequency response of the bus using a passive component to equalize signal amplitude at certain signal frequencies and minimize a phase error of signals transmitted on the bus and being within a frequency range of interest, said frequency range of interest including the operational frequency of the multidrop bus, wherein the passive component is connected to the transmission line at a location which is between 40% and 60% of the distance between first end and the first of the plurality of memory slots.

2. In a multidrop bus having a transmission line with a first end, a second end, and at least one memory device connected to the transmission line between the first end and the second end, a method of improving signal integrity of the bus comprising:

altering a frequency response of the bus to equalize signal amplitudes of signals transmitted along the transmission line within a first set of frequencies in which the phase error is at or below a desired level; and attenuating signal amplitudes within a second set of frequencies in which the phase error is above a desired level, wherein the frequencies in the second set are higher than the frequencies in the first set, wherein the altering and attenuating are achieved by connecting a passive component to the transmission line, and wherein the altering and attenuating are optimized by connecting the compensating element at a location which is between 40% and 60% of the distance between first end and the first of the at least one memory device.

3. In a multidrop bus having a transmission line with a first end, a second end, and at least one memory device connected to the transmission line between the first end and the second end, a method of improving signal integrity of the bus comprising:

altering the frequency response of the bus to peak at a lower frequency, wherein the act of altering the frequency response of the bus is achieved by connecting a passive component to the transmission line, wherein the passive component equalizes amplitudes of signals transmitted along the transmission line within a first set of frequencies in which the phase error is at or below a desired level, and attenuates signal amplitudes within a second set of frequencies in which the phase error is above a desired level, wherein the act of altering the frequency response of the bus is achieved by connecting a passive component to the transmission line at a location which is between 40% and 60% of the distance between first end and the first of the at least one memory device.

4. The method according to claim 3, wherein the frequencies in the second set are higher than the frequencies in the first set.

5. A multidrop bus comprising:

a transmission line having a first end and a second end;

a plurality of memory slots connected to the transmission line between the first end and the second end, each of said plurality of memory slots for receiving a memory module;

a terminator element connected to the second end of the transmission line; and a compensating element coupled to the transmission line between the first end of the transmission line and the plurality of memory slots, wherein said compensating element consists essentially of a capacitor, said compensating element altering a frequency response of the bus to equalize signal amplitudes at certain signal frequencies, wherein said compensating element is connected to the transmission line at a location which is between 40% and 60% of the distance between the first end and the first of the plurality of memory slots.

6. A multidrop bus comprising:

a transmission line having a first end and a second end;

a plurality of memory slots connected to the transmission line between the first end and the second end, each of said plurality of memory slots for receiving a memory module;

a terminator element connected to the second end of the transmission line; and a compensating element coupled to the transmission line between the first end of the transmission line and the plurality of memory slots, wherein said compensating element consists essentially of an inductor, wherein said compensating element is connected to the transmission line at a location which is between 40% and 60% of the distance between the first end and the first of the plurality of memory slots.

* * * * *